United States Patent Office 3,679,485
Patented July 25, 1972

3,679,485
FUEL CELL BATTERY FOR REACTING GASEOUS REACTANTS IN FUEL CELLS OPERATED WITH LIQUID ELECTROLYTE
Hans Kohlmuller, Erlangen, and Dieter Kuhl, Bubenreuth, Germany, assignors to Siemens Aktiengesellschaft, Berlin and Munich, Germany
Filed Sept. 9, 1970, Ser. No. 70,766
Claims priority, application Germany, Sept. 11, 1969, P 19 45 946.2
Int. Cl. H01m 27/00
U.S. Cl. 136—86 R
7 Claims

ABSTRACT OF THE DISCLOSURE

Fuel cell battery for reacting gaseous reactants in fuel cells operated with liquid electrolyte includes a stack of alternatingly superimposed components A and B with a component C at the respective ends of said stack, the stack being embedded in a casing of molding resin, the component A comprising a pair of diaphragms with a support frame and sealing frame sandwiched therebetween, the component B comprising a pair of diaphragms with bipolar electrodes and sealing frames sandwiched therebetween, and the component C comprising a diaphragm and a contact plate with an electrode, a spacer grid and a sealing frame sandwiched therebetween, the sealing frames, diaphragms and contact plates being provided with fins and formed with bores for supplying the reactants to and discharging the same from the battery, and the sealing frames being firmly bonded to the diaphragms and contact plates of the respective components; and method of producing the fuel cell battery.

Our invention relates to fuel cell batteries for reacting gaseous reactants in fuel cells operated with liquid electrolyte, wherein the battery is constructed of prefabricated components and is encased in molding resin, as well as method for producing the fuel cell battery.

It has been known, heretofore, to combine or integrate into a battery by means of plastic materials, bilaterally operative gas/diffusing electrodes of fuel cells. This has been effected, for example, by stacking positive and negative electrodes in alternating sequence, one upon the other, and encasing them with molding resin in a suitable mold, spacer frames, which form the space for subsequently receiving therein electrolyte and which prevents the penetration of the molding resin into the electrolyte chamber, being inserted between the electrodes and being subsequently removed therefrom after the molding resin has hardened. Supply or connecting channels provided for the electrolyte or gases have been constructed by placing formed bodies of materials, such as polyvinylalcohol, for example, which are not wetted by molding resin, on or within the stack of electrodes prior to the molding operation, and, after subsequent hardening of the molding resin, are again dissolved or melted therefrom.

It is, accordingly, an object of the present invention to provide fuel cell batteries for reacting gaseous reactants in fuel cells operated with liquid electrolyte and method of producing the same, wherein the difficulties occurring heretofore in the formation of channels and the sealing of hollow spaces in encased or sealed batteries, are avoided.

With the foregoing and other objects in view, we provide, in accordance with our invention, fuel cell batteries for reacting gaseous reactants in fuel cells operated with liquid electrolyte comprising a stack of alternatingly superimposed components A and B with a component C at the respective ends of the stack, the stack being embedded in a casting of molding resin, the component A comprising a pair of diaphragms with a support frame and sealing frame sandwiched therebetween, the component B comprising a pair of diaphragms with bipolar electrodes and sealing frames sandwiched therebetween, and the component C comprising a diaphragm and a contact plate with an electrode, a spacer grid and a sealing frame sandwiched therebetween, the sealing frames, diaphragms and contact plates being provided with fins and formed with bores for supplying the reactants to, and discharging the same from the battery, and the sealing frames being firmly bonded to the diaphragms and contact plates of the respective components; and method of producing the fuel cell battery.

The technical improvement in the art provided by the fuel cell battery of our invention is that two diaphragms are located between the gas chamber and the electrolyte chamber and serve to close the gas and electrolyte chambers in a relatively simple manner. The bores and channels for the supply and discharge of the reactants are formed in the individual components before the encasement of the battery, thereby considerably facilitating and improving the start-up as well as the operational reliability of the battery. Blockage or obstruction of the lines or channels provided for transporting the reactants within the battery, as well as impairments of the catalyst, which has been frequently observed when the formed body is dissolved or melted out of the molded casing, are thereby precluded.

The features which are considered characteristic for the invention are set forth in the appended claims.

Although the invention is illustrated and described herein as embodied in fuel cell battery for reacting gaseous reactants in fuel cells operated with liquid electrolyte, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments, when read in conjunction with the accompanying drawings, in which.

Figure 1:
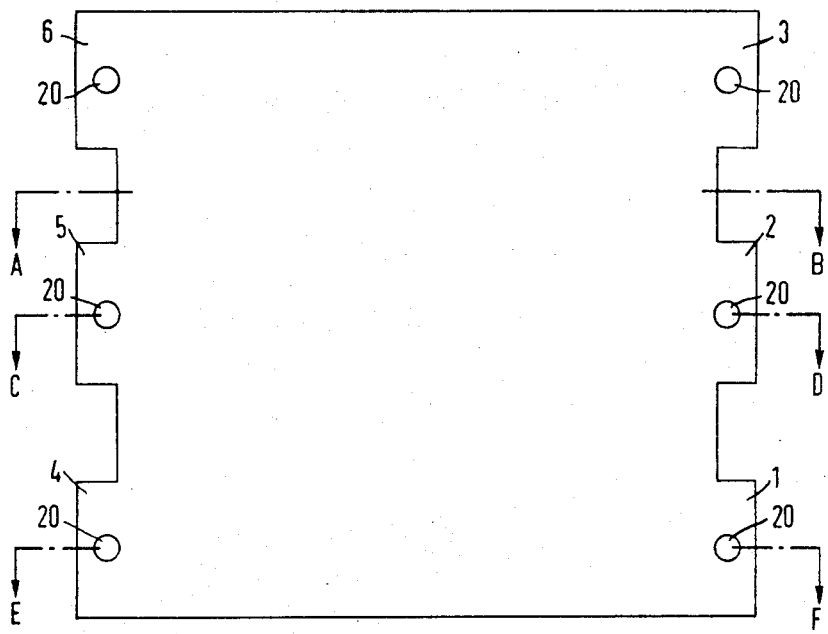
FIG. 1 is a plan view of an integrated structure formed on the components A and B of the invention.

Referring now to the drawings and first particularly to FIG. 1 thereof, there is shown in plan view therein a sheet which has a shape corresponding equally to the shape of the diaphragms and contact plates of the invention. This sheet is provided with fins 1–6. Respective diametrically opposed fins are provided for supplying and discharging a specific reactant, for which purpose they are formed with a respective bore 20. Thus, for example, oxygen is transported in the embodiment of FIG. 1 through the bores 20 formed in the fins 1 and 6; hydrogen is transported through the bores 20 in the fins 3 and 4 and electrolyte through the bores 20 in the fins 2 and 5.

Figure 2:
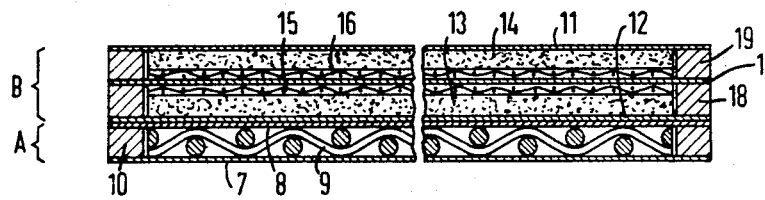
FIG. 2 is a sectional view of FIG. 1 taken along the line II—II in the direction of the arrows.
Figure 3:
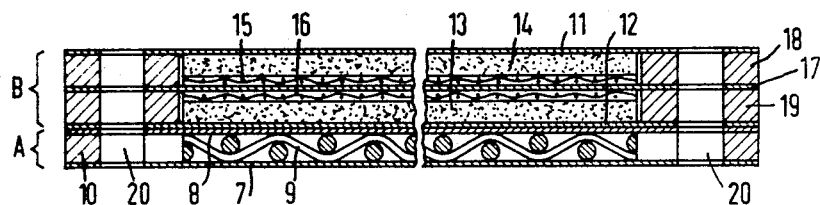
FIG. 3 is a sectional view of FIG. 1 taken along the line III—III in the direction of the arrows.
Figure 4:
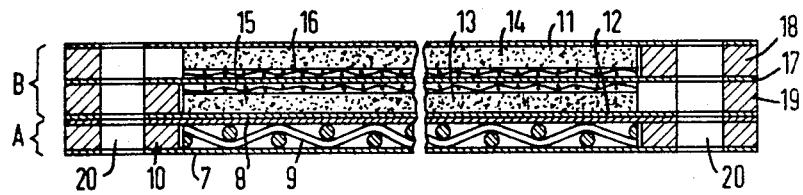
FIG. 4 is a sectional view of FIG. 1 taken along the line IV—IV in the direction of the arrows.

FIGS. 2, 3 and 4 are cross sectional views through the structural unit shown in FIG. 1. The structural unit as shown in FIGS. 2–4 is formed of two components A and B. The component A is provided with two diaphragms 7 and 8, preferably formed of asbestos paper, sandwiching therebetween a supporting frame work 9 and a sealing frame 10 adjacent thereto. The component B is formed of two diaphragms 11 and 12 between which there are sandwiched electrodes 13 and 14, having different polarities and comprised of pulverulent catalyst material which has been advantageously solidified by a binder medium. Spacer grids or screens 15 and 16 are disposed adjacent the electrodes 13 and 14, respectively, and form the required gas chambers of the electrodes. Both gas chambers are separate from one another by a contact plate 17. The component B is provided with sealing frames 18 and 19. The bores 20, in the respective fins 1–6, form channels for transporting the reactants, as aforementioned.

Depending upon the location thereof within the components A and B, the six fins of the sealing frames are formed with hollow or blind fins. By blind fins it is meant that they have only a bore for the connecting channels. By hollow fins it is meant that they are provided with bores affording access to the electrolyte chambers and/or the gas chambers.

The sealing frames are formed of an elastic polychlorbutadiene (Neoprene), sulfurized polyethylene (Hypalon) or the like and must be resistant to the electrolyte. They are connected or bonded to the diaphragm or the contact plates either by means of an adhesive or by vulcanization. Their thickness is about 1–3 mm. but, is nevertheless not limited in any way to this range.

Figure 5:
FIG. 5 is a sectional view of component C.

In FIG. 5 there is shown a cross sectional view of the component C of the battery which is located at the end of the stack of components A and B. The plan configuration of the component C corresponds to that of components A and B and is namely as shown in FIG. 1. Instead of being provided with bipolar electrodes such as those of the component B, component C is provided with only a single electrode.

The method of construction of the fuel cell battery of the invention is effected by stacking the components A and B initially in alternating sequence on top of one another, and providing a component C, respectively, at each end of the stack. Thereafter, the stack of fuel elements is pressed together and is placed in a mold wherein it is encased with a molding resin such as an epoxide resin, for example.

We claim:

1. Fuel cell battery for reacting gaseous reactants in fuel cells operated with liquid electrolyte which comprises a stack of alternatingly superimposed components A and B with a component C at the respective ends of said stack, said stack being embedded in a casing of molding resin, said component A comprising a pair of diaphragms with a support frame and sealing frame sandwiched therebetween, said component B comprising a pair of diaphragms with bipolar electrodes and sealing frames sandwiched therebetween, and said component C comprising a diaphragm and a contact plate with an electrode, a spacer grid and a sealing frame sandwiched therebetween, said sealing frames, diaphragms and contact plates being provided with fins and formed with bores for supplying the reactants to and discharging the same from the battery, and said sealing frames being firmly bonded to the diaphragms and contact plates of the respective components.

2. Fuel cell battery according to claim 1 wherein two electrodes of different polarity, two spacer grids and a contact plate, as well as two sealing frames are sandwiched between said pair of diaphragms of said component B, said last-mentioned two sealing frames being firmly bonded to said last-mentioned contact plate and to said diaphragms of said component B.

3. Fuel cell battery according to claim 1, wherein said sealing frames are formed of an elastomer.

4. Fuel cell battery according to claim 3, wherein said elastomer is polychlorbutadiene.

5. Fuel cell battery according to claim 1, wherein said sealing frames are secured by adhesive to said contact plates and said diaphragms.

6. Fuel cell battery according to claim 1, wherein said sealing frames are secured by vulcanizing means to said contact plates and said diaphragms.

7. Fuel cell battery according to claim 1, wherein said diaphragms are formed of asbestos.

References Cited
UNITED STATES PATENTS

| | | | |
|---|---|---|---|
| 690,770 | 1/1902 | Morrill | 136—87 |
| 2,928,783 | 3/1960 | Bacon | 136—86 X |
| 2,969,315 | 1/1961 | Bacon | 136—120 FC |
| 3,554,812 | 1/1971 | Sturm et al. | 136—86 D |

WINSTON A. DOUGLAS, Primary Examiner

H. A. FEELEY, Assistant Examiner